(12) United States Patent
Sodagar (10) Patent No.: US 11,973,820 B2
(45) Date of Patent: Apr. 30, 2024

(54) METHOD AND APPARATUS FOR MPEG DASH TO SUPPORT PREROLL AND MIDROLL CONTENT DURING MEDIA PLAYBACK

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/949,592

(22) Filed: Sep. 21, 2022

(65) Prior Publication Data

US 2023/0103367 A1  Apr. 6, 2023

Related U.S. Application Data

(60) Provisional application No. 63/253,050, filed on Oct. 6, 2021.

(51) Int. Cl.
*H04L 67/02* (2022.01)
*H04N 21/84* (2011.01)

(52) U.S. Cl.
CPC ............. *H04L 67/02* (2013.01); *H04N 21/84* (2013.01)

(58) Field of Classification Search
CPC ........... H04N 21/23424; H04N 21/812; H04N 21/2353; H04N 21/26258
See application file for complete search history.

(56) References Cited

U.S. PATENT DOCUMENTS

| 11,218,784 B1* | 1/2022 | Mekuria ................. H04N 21/84 |
| 2010/0235468 A1* | 9/2010 | Cobb ................. G06Q 30/0277 709/218 |
| 2013/0007223 A1* | 1/2013 | Luby .............. H04N 21/234327 709/219 |

(Continued)

OTHER PUBLICATIONS

"Information technology—Dynamic adaptive streaming over HTTP (DASH)—Part 1: Media presentation description and segment formats", ISO 23009-1:2021(X), ISO/IEC JTC 1/SC 29/WG 3, Jun. 24, 2021, 333 pages.

(Continued)

*Primary Examiner* — Chirag R Patel
(74) *Attorney, Agent, or Firm* — Sughrue Mion, PLLC (57) ABSTRACT

A method and apparatus may be provided for signaling auxiliary media including pre-roll media content and mid-roll media content in a main media stream including receiving main media presentation descriptions (MPD) comprising one or more main media segments and at least one auxiliary descriptor referencing one or more auxiliary MPDs. The auxiliary MPD may include one or more auxiliary media segments that are independent of the one or more main media segments. The method may include retrieving the one or more auxiliary MPDs referenced in the one or more main MPD using the at least one auxiliary descriptor, the auxiliary MPD of the one or more auxiliary MPDs comprising the one or more auxiliary media segments and an auxiliary media presentation duration. The one or more auxiliary media segments and the one or more main media segments may be appended to a media source extension (MSE) source buffer and dispatched.

18 Claims, 8 Drawing Sheets

(56) References Cited

U.S. PATENT DOCUMENTS

| | | | |
|---|---|---|---|
| 2015/0269629 A1* | 9/2015 | Lo | H04N 21/4532 |
| | | | 705/14.66 |
| 2015/0271237 A1* | 9/2015 | Stockhammer | H04N 21/235 |
| | | | 709/219 |
| 2017/0048565 A1* | 2/2017 | Einarsson | H04N 21/44016 |
| 2018/0192093 A1* | 7/2018 | Loheide | H04N 21/26283 |
| 2019/0238950 A1 | 8/2019 | Stockhammer et al. | |
| 2021/0409818 A1* | 12/2021 | Bouazizi | H04L 65/60 |

OTHER PUBLICATIONS

"Media Source Extensions™", W3C Recommendation, Nov. 17, 2016, 77 pages.

"Draft text of ISO/IEC 23009-1 4th edition DAM 2 PrePeriod, nonlinear playback and other extensions", ISO/IEC JTC 1/SC 29/WG 03, N0320, Jul. 30, 2021, 41 pages.

International Search Report dated Jan. 6, 2023, in International Application No. PCT/US22/44498.

Written Opinion dated Jan. 6, 2023, in International Application No. PCT/US22/44498.

Systems subgroup, "Technologies under Consideration for Dynamic Adaptive Streaming over HTTP 23009, Parts 1, 3, 4, 5, and 6", International Organisation for Standardisation Organisation Internationale De Normalisation ISO/IEC JTC1/SC29/WG11 Coding of Moving Pictures and Audio, ISO/IEC JTC1/SC29/WG11 MPEG2019/N19008, Jan. 2020, Brussels, BE, pp. 1-93 (93 pages total).

Extended European Search Report issued Mar. 6, 2024 in European Application No. 22879092.9.

* cited by examiner

```
<?xml version="1.0" encoding="utf-8"?>
<MPD
 xmlns="urn:mpeg:dash:schema:mpd:2011"
 xmlns:xsi="http://www.w3.org/2001/XMLSchema-instance"
 xsi:schemaLocation="urn:mpeg:dash:schema:mpd:2011 DASH-MPD.xsd"
 availabilityStartTime="1970-01-01T00:00:00Z" maxSegmentDuration="PT6S"
 minBufferTime="PT2S" minimumUpdatePeriod="PT5M"
 profiles="urn:mpeg:dash:profile:isoff-live:2011" publishTime="2019-03-12T01:17:30Z"
 timeShiftBufferDepth="PT8M20S" type="dynamic">

<EssentialProperty id="e0" schemeIdUri="urn:mpeg:dash:auxiliary:2021" value="preroll.adcom.com PT0S " />
<EssentialProperty id="e1" schemeIdUri="urn:mpeg:dash:auxiliary:2021" value="preroll.adcom.com PT3600S " />
<EssentialProperty id="e2" schemeIdUri="urn:mpeg:dash:auxiliary:2021" value="preroll.adcom.com PT7200S PT0S" />

<Period id="p0" start="PT0S">
 <BaseURL>http://liveserver.com/live/live1/</BaseURL>
 <AdaptationSet contentType="video" maxHeight="1920" maxWidth="1080"
  mimeType="video/mp4" par="16:9" segmentAlignment="true" startWithSAP="1">
  <SegmentTemplate duration="2" initialization="$RepresentationID$/init.mp4"
   media="$RepresentationID$/$Number$.m4s" startNumber="0" />
  <Representation id="V300" bandwidth="300000" codecs="avc1.64001e"
   frameRate="60/2" />
  <Representation id="V600" bandwidth="600000" codecs="avc1.64001e"
   frameRate="60/2" />
 </AdaptationSet>
</Period>
</MPD>
```

METHOD AND APPARATUS FOR MPEG DASH TO SUPPORT PREROLL AND MIDROLL CONTENT DURING MEDIA PLAYBACK

CROSS REFERENCE TO RELATED APPLICATION

The present application claims priority to U.S. Provisional Application No. 63/253,050, filed on Oct. 6, 2021, the contents of which is hereby expressly incorporated by reference, in its entirety, into the present application.

FIELD

Embodiments of the present disclosure are directed to the streaming media content, and more particularly to streaming media, ad, and live content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, media presentation description (MPD) and events are used for delivering media timeline related events to a client. ISO/IEC 23009-1 DASH standard allows the streaming of multi-rate content. The DASH standard provides a single linear timeline where the periods are the continuation of each other in a single timeline. ISO/IEC 23009-1 also provides a tool for MPD chaining, i.e. signaling the URL of the next MPD to play in an MPD which can be used for pre-roll ad insertion.

MPEG DASH provides a standard for streaming multimedia content over IP networks. While the standard addresses linear playback of media content, the standard fails to address situations of nonlinear operation, e.g., where the media segments associated with different timelines that are independent of each other. MPD chaining and pre-roll ad insertion may be used to overcome the above-mentioned deficiencies. However, even MPD chaining and pre-roll ad insertion fails when DASH players use W3C Media Source Extensions because it is very challenging to address such nonlinear playback with one single MSE source buffer. Furthermore, MPD chaining and pre-roll ad insertion cannot be used when W3C Encrypted Media Extensions for playback of protected live content when an ad is expected to be played before it using MPD chaining or pre-roll elements.

Therefore, a method for combining auxiliary content or independent content that is different from the main media content is needed. Specifically, methods and apparatus of combining auxiliary content with main media content as pre-roll playback or mid-roll playback are needed. Furthermore, a method for processing W3C Encrypted Media Extensions for playback of protected live content using MPD chaining is also needed.

SUMMARY

The present disclosure addresses one or more technical problems. The present disclosure includes a method, process, apparatus, and non-transitory computer-readable medium for implementing a new concept—auxiliary presentation and auxiliary MPDs for DASH standard that may allow describing auxiliary or independent media presentation from the main media presentation. In addition, embodiments of the disclosure also provide support for inclusion of pre-roll and mid-roll content during the main presentation.

Embodiments of the present disclosure may provide a method for signaling auxiliary media including pre-roll media content and mid-roll media content in a main dynamic adaptive streaming over HTTP (DASH) media stream. The method may be performed by at least one processor, and may include, receiving one or more main media presentation description (MPD) including one or more main DASH media segments and at least one auxiliary descriptor including a Uniform Resource Locator (URL) referencing one or more auxiliary MPDs, wherein an auxiliary MPD among the one or more auxiliary MPDs includes one or more auxiliary media segments that are independent of the one or more main DASH media segments; retrieving the one or more auxiliary MPD referenced by the URL in the one or more main MPD using the at least one auxiliary descriptor, the auxiliary MPD of the one or more auxiliary MPD including the one or more auxiliary media segments and an auxiliary media presentation duration; appending the one or more auxiliary media segments and the one or more main DASH media segments to a media source extension (MSE) source buffer; and dispatching the one or more auxiliary media segments and the one or more main DASH media segments from the MSE source buffer based on a presentation time offset associated with the one or more auxiliary media segments and the one or more main DASH media segments.

Embodiments of the present disclosure may provide an apparatus for signaling auxiliary media including pre-roll media content and mid-roll media content in a main dynamic adaptive streaming over HTTP (DASH) media stream. The apparatus may include at least one memory configured to store computer program code; at least one processor configured to access the computer program code and operate as instructed by the computer program code. The program code may include receiving code configured to cause the at least one processor to receive one or more main media presentation description (MPD) including one or more main DASH media segments and at least one auxiliary descriptor including a Uniform Resource Locator (URL) referencing one or more auxiliary MPDs, wherein an auxiliary MPD among the one or more auxiliary MPDs includes one or more auxiliary media segments that are independent of the one or more main DASH media segments; retrieving code configured to cause the at least one processor to retrieve the one or more auxiliary MPDs referenced by the URL in the one or more main MPD using the at least one auxiliary descriptor, the auxiliary MPD of the one or more auxiliary MPDs may include the one or more auxiliary media segments and an auxiliary media presentation duration; appending code configured to cause the at least one processor to append the one or more auxiliary media segments and the one or more main DASH media segments to a media source extension (MSE) source buffer; and dispatching code configured to cause the at least one processor to dispatch the one or more auxiliary media segments and the one or more main DASH media segments from the MSE source buffer based on a presentation time offset associated with the one or more auxiliary media segments and the one or more main DASH media segments.

Embodiments of the present disclosure may provide a non-transitory computer-readable medium storing instructions. The instructions may include one or more instructions that, when executed by one or more processors of a device for signaling auxiliary media including pre-roll media content and mid-roll media content in a main dynamic adaptive streaming over HTTP (DASH) media stream, cause the one or more processors to receive one or more main media presentation description (MPD) may include one or more main media segments and at least one auxiliary descriptor including a Uniform Resource Locator (URL) referencing one or more auxiliary MPDs, wherein an auxiliary MPD among the one or more auxiliary MPDs may include one or more auxiliary media segments that are independent of the one or more main DASH media segments; retrieve the one or more auxiliary MPD referenced by the URL in the one or more main MPD using the at least one auxiliary descriptor, the auxiliary MPD of the one or more auxiliary MPDs may include the one or more auxiliary media segments and an auxiliary media presentation duration; append the one or more auxiliary media segments and the one or more main DASH media segments to a media source extension (MSE) source buffer; and dispatch the one or more auxiliary media segments and the one or more main DASH media segments from the MSE source buffer based on a presentation time offset associated with the one or more auxiliary media segments and the one or more main DASH media segments.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
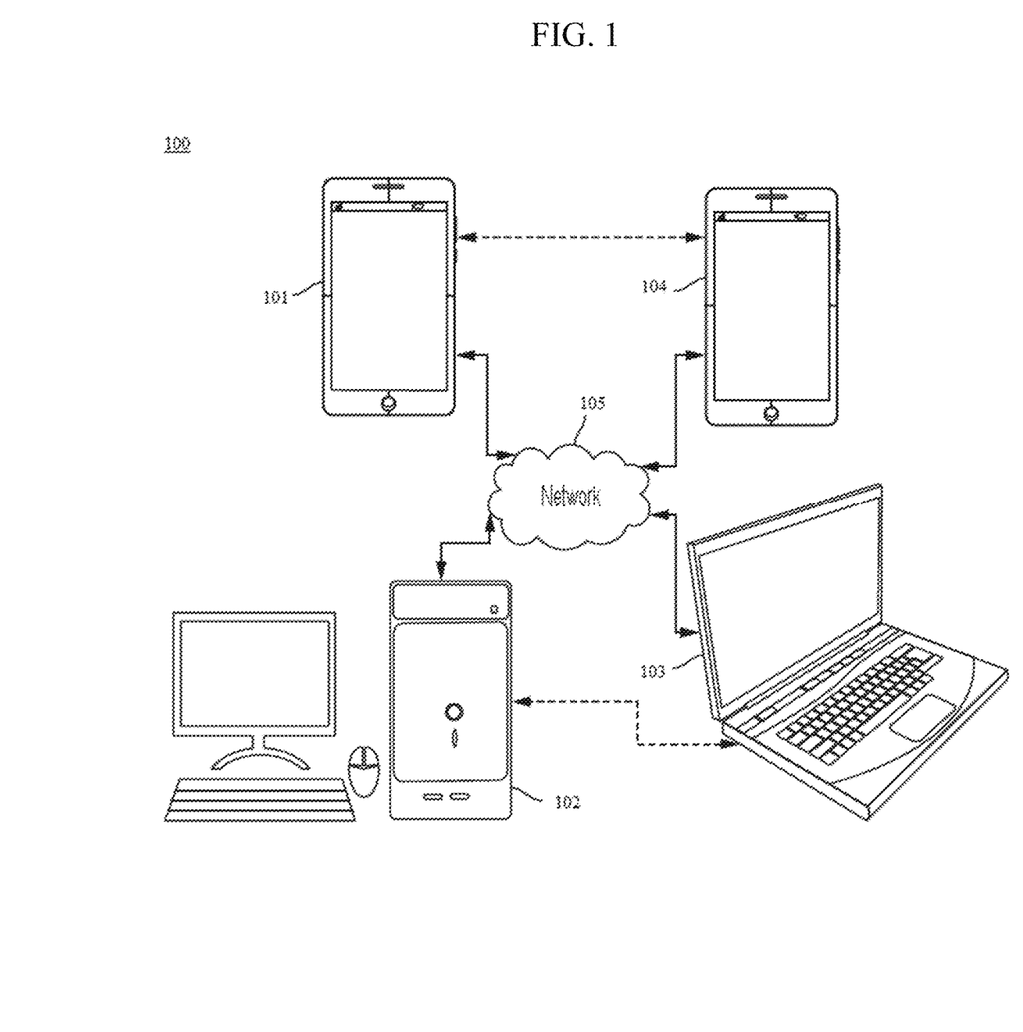
FIG. 1 is a simplified illustration of a communication system, in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
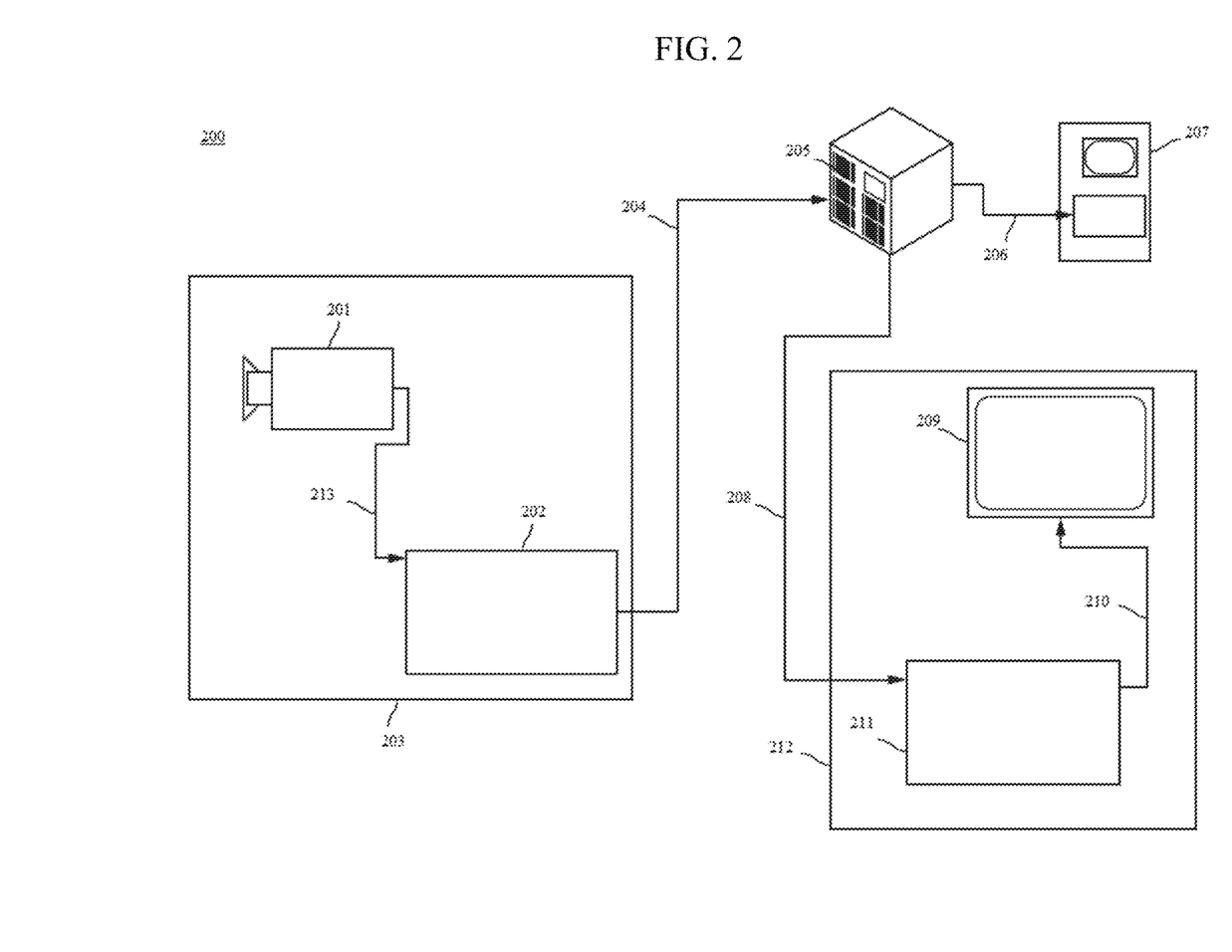
FIG. 2 is an example illustration of placements of components in a streaming environment, in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203 that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201. The encoder 202 can include hardware, software, or a combination thereof to enable or implement aspects of embodiments as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve encoded video bitstream 208 and 206 which may be copies of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the encoded video bitstreams 204, 206 and 208 can be encoded according to certain video coding/compression standards. Examples of those standards are noted above and described further herein.

Figure 3:
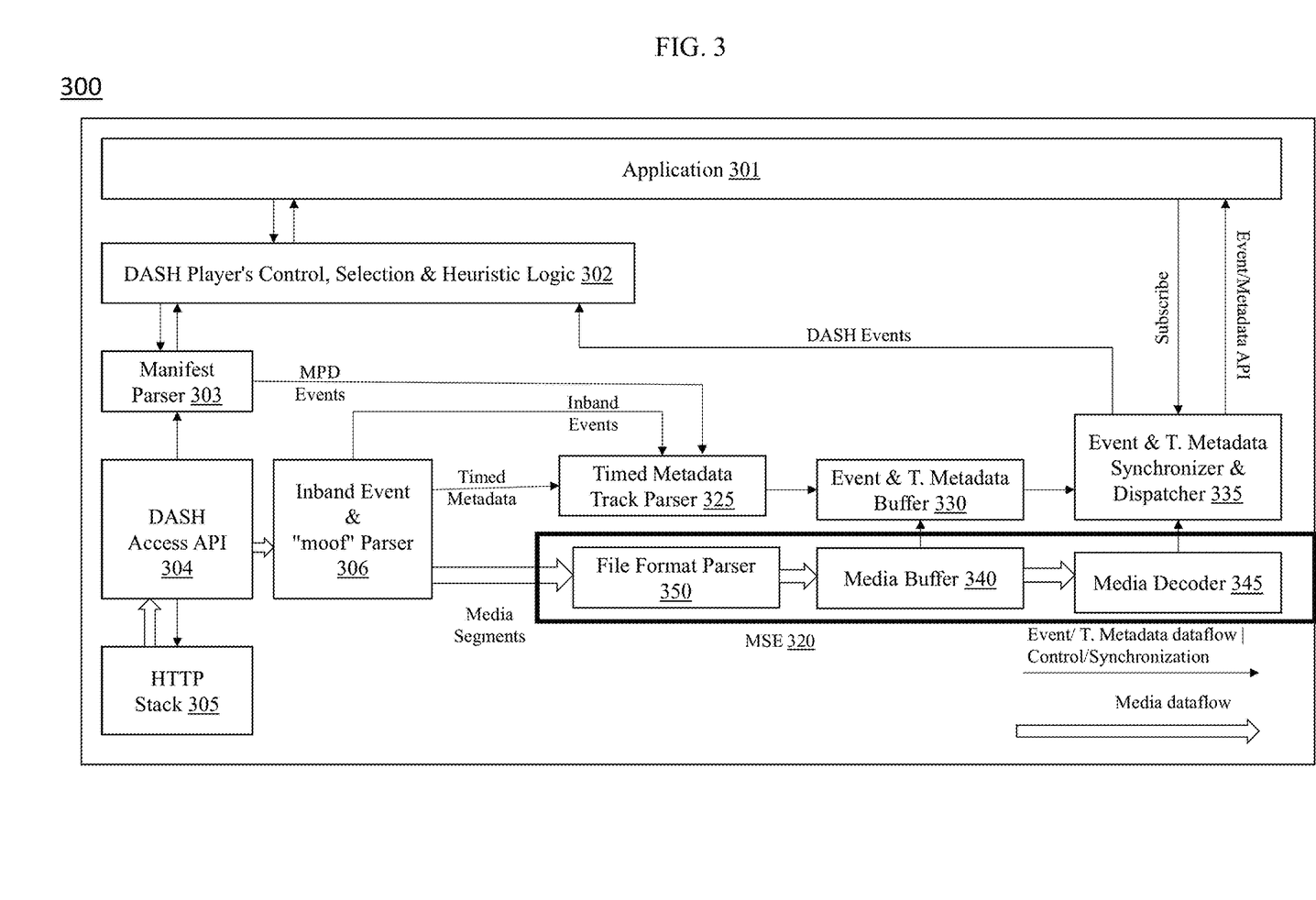
FIG. 3 is a simplified block diagram of a DASH processing model, in accordance with embodiments.

FIG. 3 shows a sample DASH processing model 300, such as of a sample client architecture for processing DASH and CMAF events. In the DASH processing model 300, a client's request of media segments (e.g., ad media segments and live media segments) may be based on described addresses in a manifest 303. The manifest 303 also describes metadata tracks from which a client may access segments of metadata tracks, parse them, and send them to an application 301.

The manifest 303 includes MPD events or events, and an inband event and 'moof' parser 306 may parse MPD event segments or event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include a pipeline including a file format parser 350, the media buffer 340, and a media decoder 345. MSE 320 is a logical buffer(s) of media segments, where the media segments may be tracked and ordered based on the media segments' presentation time. Media segments may include but may not be limited to ad media segments associated with ad MPDs and live media segments associated with live MPDs. Each media segment may be added or appended to the media buffer 340 based on the media segments' timestamp offset, and the timestamp offset may be used to order the media segments in the media buffer 340.

Since embodiments of the present application may be directed to building a linear media source extension (MSE) buffer from two or more nonlinear media sources using MPD chaining, and the nonlinear media sources may be ad MPDs and live MPDs, the file format parser 350 may be used to process the different media and/or codecs used by the live media segments included in the live MPDs. In some embodiments, the file format parser may issue a change type based on a codec, profile, and/or level of the live media segments.

As long as media segments exist in the media buffer 340, the event and metadata buffer 330 maintains corresponding event segments and metadata. The sample DASH processing model 300 may include a timed metadata track parser 325 to keep track of the metadata associated with the inband and MPD events. According to FIG. 3, the MSE 320 includes only the file format parser 350, the media buffer 340, and the media decoder 345. The event and metadata buffer 330 and event and metadata synchronizer and dispatcher 335 are not native to the MSE 320, inhibiting the MSE 320 from natively processing events and sending them to the application.

Auxiliary Presentation

Embodiments of the present disclosure define an auxiliary media presentation to be a media presentation that is independent of the main media presentation of an MPD. As an example, ad media segments or live media segments that are independent of the main media segments may be auxiliary presentations. Updates to any auxiliary media presentation or auxiliary media segments do not affect the main media segments. Similarly, updates to the main media segments do not affect the auxiliary media segments. Therefore, auxiliary media segments (also referred to as auxiliary media presentations or auxiliary presentations) may be completely independent of the main media segments (also known as main media presentations and media presentations in this disclosure).

Auxiliary MPD

An MPD is a media presentation description that may include a media presentation in a hierarchical organization. An MPD may include one or more sequence of periods, wherein each period may include one or more adaptation sets. Each adaptation set in an MPD may include one or more representations, each representation including one or more media segments. These one or more media segments carry the actual media data and associated metadata being encoded, decoded, and/or played. auxiliary MPD may include one or more auxiliary media segments, and according to an aspect, each auxiliary media segment included in the auxiliary MPD may be made available at the main MPD availability start time. According to another or same aspect, the auxiliary MPD must include a @mediaPresentationDuration. The media presentation duration may include a presentation duration of one or more auxiliary media segments. In some embodiments, the media presentation duration may include a total media presentation time of all the auxiliary media segments included in the MPD.

As stated above, embodiments of the present disclosure define an auxiliary MPD that represents auxiliary content that is independent from the main media content. According to an aspect, the main MPD may include a reference to at least one, or in some embodiments, each auxiliary MPD using an auxiliary descriptor. The auxiliary descriptor may have a specific syntax. As an example, an auxiliary descriptor may include an element known as EssentialProperty or may include an element known as SupplementalProperty that may describer or identify the auxiliary MPD. The auxiliary descriptor may also include a specific universal resource name for a scheme of the auxiliary descriptor. As an example, a specific urn for the auxiliary descriptor may include @scheme such as "urn:mpeg:dash:auxiliary:2021". The auxiliary descriptor may also include a @value that may include an auxiliary MPD URL, a start time value, and a return time value.

According to an aspect, a start time value (also referred to as start value, start time attribute, and just start in the present disclosure) may represent a moment in the main media presentation at which the main media presentation is stopped and the auxiliary media presentation is played. In some embodiments, if start=0 for an auxiliary media segment, the auxiliary media presentation may be a pre-roll auxiliary media segment. When the auxiliary media presentation is a pre-roll auxiliary media segment, the auxiliary media segment may be played for the first time before playing the main media segments.

According to an aspect, a return time (may also be referred to as "returnType") value may value may represent an offset from the moment in the main media timeline that the main media presentation is stopped for playing the auxiliary MPD or one or more auxiliary media segments. In some embodiment, the default value for returnTime value is the media presentation duration associated with the auxiliary MPD. A returnTime value of zero would result in joining the main media presentation at the moment it was stopped to play the auxiliary media segment.

Figure 4A:
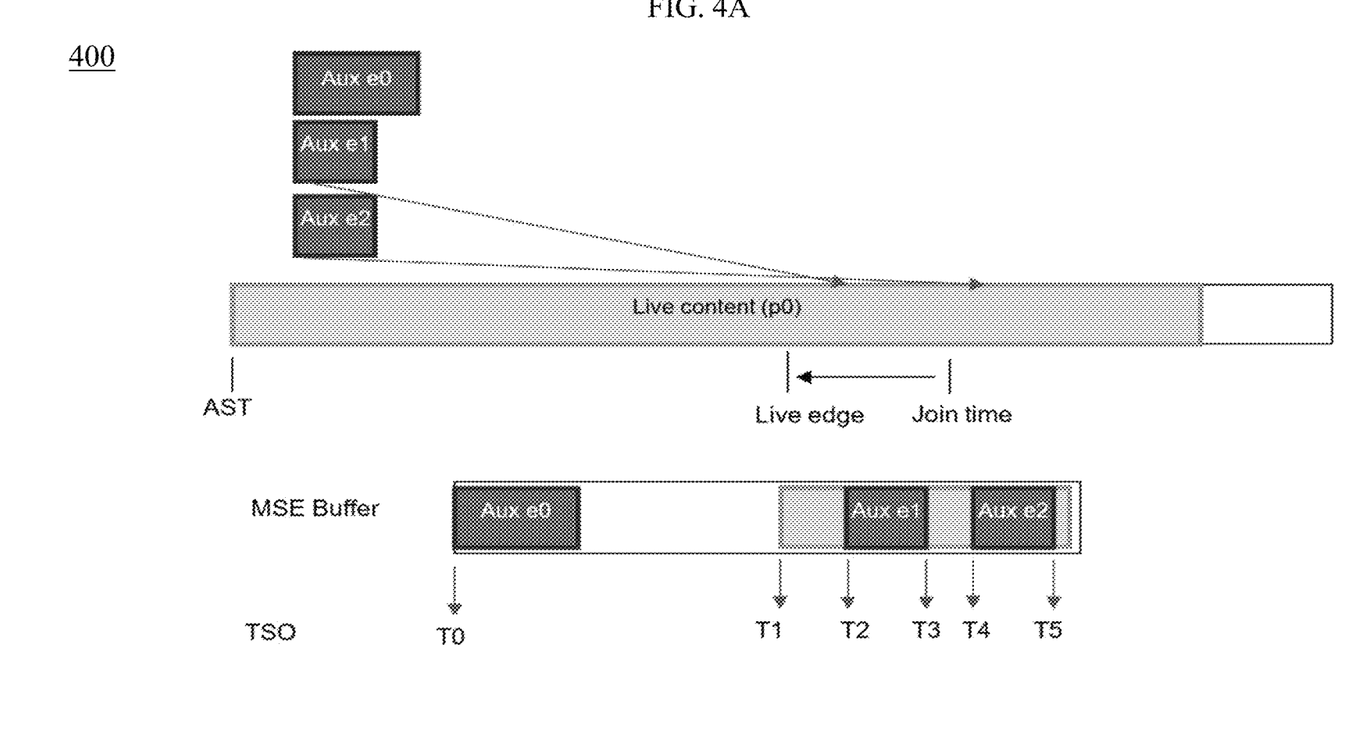
FIG. 4A is a simplified illustration of media source extension (MSE) source buffer implementation of auxiliary media presentation descriptor (MPD), in accordance with embodiments.
Figure 4B:
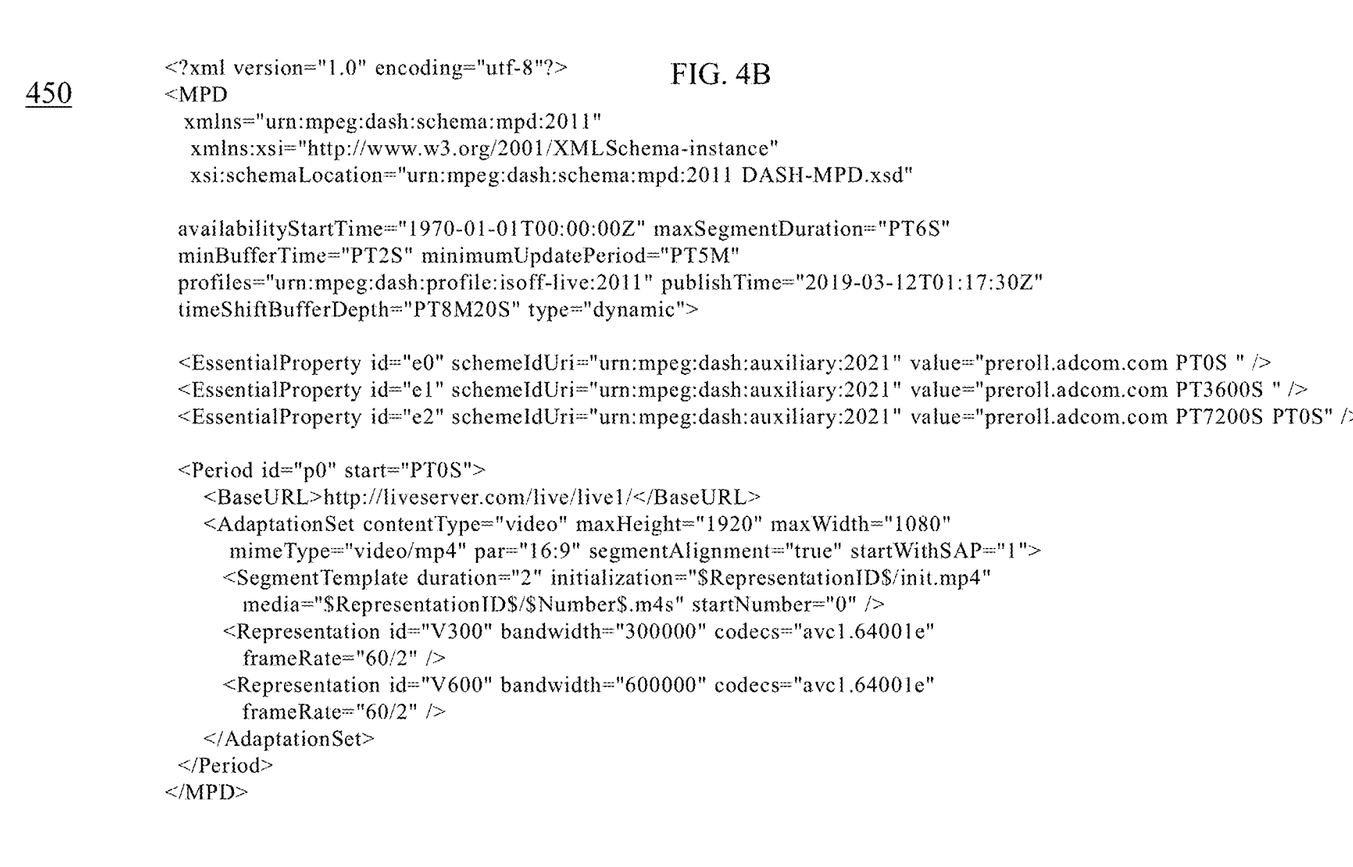
FIG. 4B is exemplary script for an auxiliary MPD element for playing pre-roll and mid-roll auxiliary media content, according to embodiments.

FIG. 4B is exemplary script 450 indicating xml code enabling an auxiliary MPD element for playing pre-roll and mid-roll auxiliary media content, according to embodiments.

As shown in FIG. 4B, the auxiliary MPD described by the EssentialProperty descriptor with @id="e0" may be a pre-roll media segment, while the auxiliary MPD described by the EssentialProperty descriptor with @id="e1" and @id="e2" may be mid-roll media segmentation. In some embodiments, the auxiliary MPDs may be disclosed prior to one or more periods in the auxiliary MPDs.

Implementation of Auxiliary MPD with the MSE source buffer.

The W3C MSE is a sequential buffer. As long as the MSE source buffer TimeStamp Offset (TSO) is set properly such that the content that is expected to be played sequentially and is appended in the right location, then MSE source buffer plays the content correctly. According to an embodiment, at each moment that the main presentation is switched to an auxiliary presentation or it is switched back to the main presentation, the MSE time stamp offset (TSO) may be adjusted to place the main media segments and the auxiliary media segments in the right location of the MSE buffer.

FIG. 4A is a diagram 400 of a MSE source buffer described using the xml code in FIG. 4B.

As shown in diagram 400, auxiliary MPD aux e0 may be a pre-roll MPD, and aux e1 and aux e2 may be mid-roll MPDs. Live content p0 may be the main MPD comprising one or more main media segments.

Since aux e0 is a pre-roll MPD, the one or more auxiliary media segments from aux e0 may be retrieved and placed at the beginning of the MSE source buffer prior to any main media segments. When fetching and appending pre-roll auxiliary media segments in aux e0, the MSE TSO is zero.

$$T0=e0@PTO \qquad \text{Eqn (1)}$$

In some embodiments, subsequent to fetching and appending each pre-roll auxiliary media segment, the MSE TSO may be updated based on the start time of the live media p0, the presentation time of the live media p0, and the time shift buffer depth. As an example, in FIG. 4A, T1 may be based on a depth of the time shift buffer, a duration of the pre-roll auxiliary media segments, and a presentation time offset associated with the live media.

$$T1=\text{Max}(\text{timeShiftBuffeerDepth,Live edge}-P0\text{Start})+ e0@\text{duration}+p0@PTO-e0@PTO \qquad \text{Eqn (2)}$$

For mid-roll auxiliary MPD aux e1 and aux e2:

$$T2=T1+e1@\text{start}+e1@PTO-p0@PTO \qquad \text{Eqn (3)}$$

$$T3=T2+e1@\text{returnTime}-p0@PTO-e1@PTO \qquad \text{Eqn (4)}$$

$$T4=T1+e2@\text{start}+e2@PTO-p0@PTO \qquad \text{Eqn (5)}$$

$$T5=T4+p0@PTO-e2@PTO \qquad \text{Eqn (6)}$$

Where e0@PTO, e1@PTO, and e2@PTO are the Presentation Time Offset of the first Period in auxiliary MPDs linked in the essential descriptors in that order, and ei@starttime and ei@returnTime are the start time value and returnTime value in each corresponding descriptor that has the id=ei.

According to embodiments, updating the MSE TSO may be based on the following:

The pre-roll auxiliary media segments may start from the MSE append window start (0). Since the pre-roll auxiliary media segments are fetched and appended first, the MSE TSO is set equal to the PTO of the auxiliary MPD (e.g., see Eqn (1)).

In some embodiments, after appending the last segment of pre-roll auxiliary media segments, the live edge associated with the live media or main media segments may be calculated. Using a size of the DVR window, the live edge, a period start and duration of pre-roll auxiliary MPD or media segments, and the PTO of live content, the MSE TSO may be adjusted such that there is a threshold time range between the first media segment appending to the MSE buffer and the last segment of pre-roll auxiliary MPD that was previously added. As an example, see Eqn (2). In some embodiments, the threshold may be less than, equal to, or more than the DVR window. A DVR window may include an ability of the client to scrub back or to start playback at an earlier point in the main media stream.

According to embodiments, with each appended auxiliary MPD or media segments, its offset from the live edge is calculated. The MSE TSO is increased by this offset and adjusted based the live period PTO and auxiliary MPD's/media segments' PTO. As another or same embodiment, at the end of each auxiliary MPD/media segment, the MSE TSO is adjusted based on the auxiliary MPD's/media segments' returnTime, live period PTO, and auxiliary MPD's/media segments' PTO.

In some embodiments, a the playback of the pre-roll auxiliary MPD/media segments, the client may decide to remove the pre-roll auxiliary MPD/media segments time range from MSE, therefore the pre-roll may be played only once. In some embodiments, the pre-roll may not played if the DVR is accessed. The client also may remove time ranges from the MSE append window buffer according to the value of the timeShiftBufferDepth after joining the live session.

Figure 5:
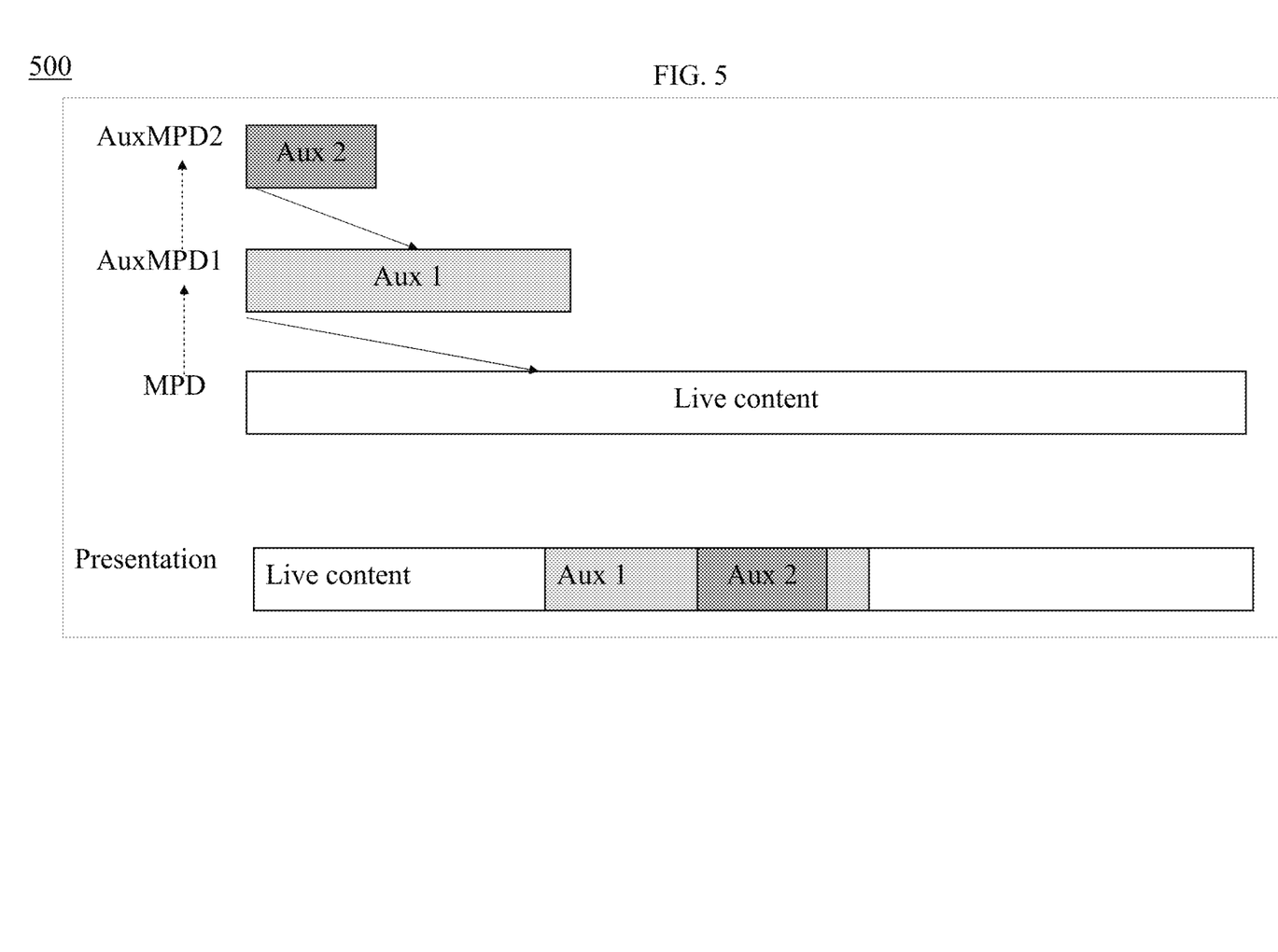
FIG. 5 is an exemplary illustration of stacking presentation based on auxiliary MPDs, in accordance with embodiments.

FIG. 5 is an exemplary stacker presentation 500 illustrating stacking presentations based on auxiliary MPDs.

As seen in FIG. 5, the a combined presentation may start with live content (main media) and may also include one or more independent and auxiliary media segments. Based on aux MPD1 being referenced in the main MPD, the presentation of the live content (main media segment) may be stopped to instead present auxiliary media segments from aux 1.

In some embodiments, based on the aux MPD2 being referenced in aux MPD1, the presentation of the auxiliary media segments from aux 1 is stopped and instead auxiliary media segments from aux 2 may be played and/or dispatched. At the end of aux 1 and the auxiliary media segments from aux 1 and the end of aux 2 and the auxiliary media segments from aux 2, the presentation may switch back to the live content. Thus, auxiliary media segments (or presentations) may be supported my an MSE source buffer as pre-roll auxiliary media or mid-roll auxiliary media when the main media stream is independent of the auxiliary media stream.

Therefore, embodiments of the disclosure may provide methods and apparatus for signaling the auxiliary media presentation from the main media presentation defined in MPD by insertion of preroll and midroll content in the media presentation. Each auxiliary presentation may be represented by an essential or supplemental descriptor in MPD that may include the URL to the auxiliary MPD. There may be additional constraints including the stop and joining back times of the main media presentation may be defined by start time value and returnTime values in the same descriptor. In some embodiments, the auxiliary MPD may be used for playback pre-roll auxiliary content before playback of main content or mid-roll insertion of auxiliary content. The restrictions may also define whether the main media presentation may need to be time-shifted after the mid-roll or whether mid-roll replaces the main content during that duration of the Auxiliary MPD. In some embodiments, the MPD periods may be updated independent from the auxiliary MPDs, and the MSE and EME can be may be with single MSE buffer for the playback of main content and auxiliary content since the buffer may be set up considering the main content characteristics.

Embodiments of the present disclosure may also provide methods and apparatus of fetching and playing back the auxiliary content along with the main content using the MSE source buffer by defining the operations of appending various segments for pre-roll auxiliary content, mid-roll auxiliary content, and the main content based on the MSE TSO being adjusted according to embodiments of the present disclosure.

Embodiments of the present disclosure may also be directed to combining presentations by stack operation of auxiliary MPDs according to any embodiment herein, where each main MPD may have a reference to an auxiliary MPD, and the auxiliary MPD may reference another auxiliary MPD creating a stack of referenced MPDs which resulting in a stack presentation.

Figure 6:
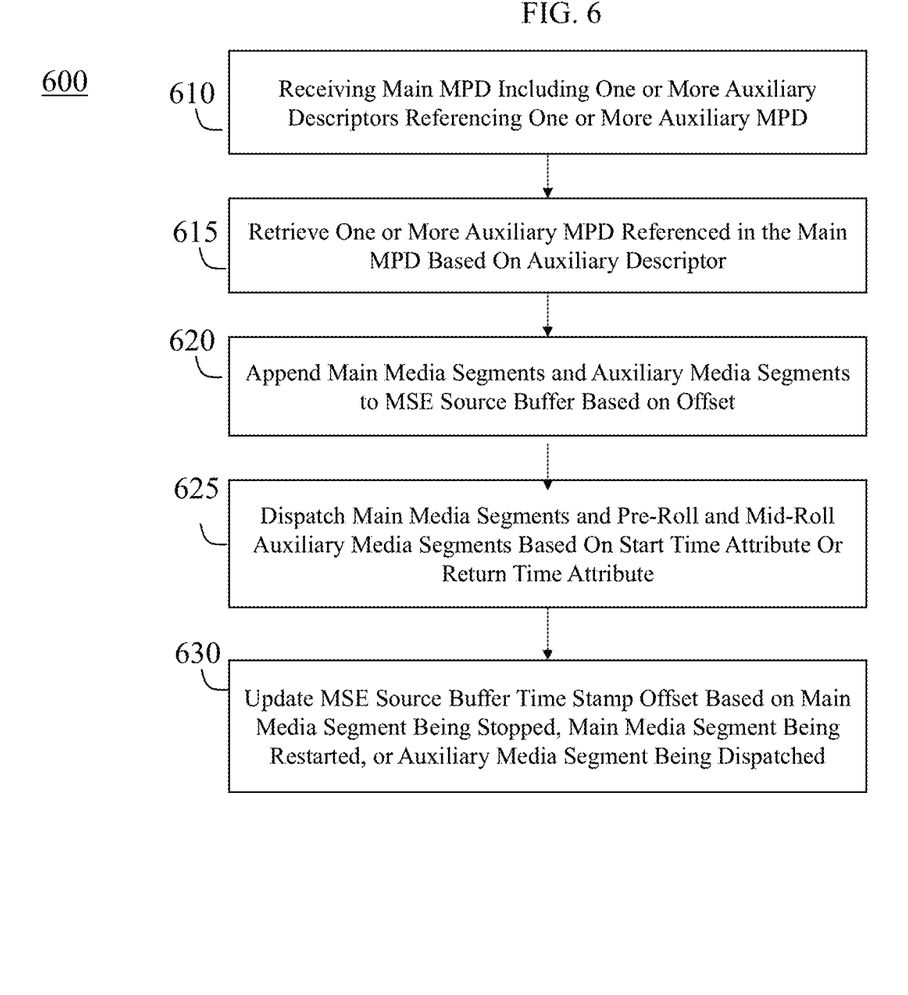
FIG. 6 is an exemplary flowchart illustration for signaling auxiliary media including pre-roll media content and mid-roll media content in a main media stream, in accordance with embodiments.

FIG. 6 is an exemplary flowchart of a process 600 for signaling auxiliary media including pre-roll media content and mid-roll media content in a main media stream.

At operation 610, one or more main media presentation description (MPD) comprising one or more main media segments and at least one auxiliary descriptor referencing one or more auxiliary MPD may be received. As an example, the MSE 320 may receive one or more main media presentation description (MPD) comprising one or more main media segments and at least one auxiliary descriptor referencing one or more auxiliary MPD may be received. In some embodiments, an auxiliary MPD among the one or more auxiliary MPD may include one or more auxiliary media segments that are independent of the one or more main media segments. The auxiliary descriptor may include a start time attribute indicating a first time offset at which a main media segment among the one or more main media segments may be stopped to dispatch an auxiliary media segment among the one or more auxiliary media segments.

The auxiliary descriptor may include a return time attribute indicating a second time offset at which the main media segment among the one or more main media segments may be restarted after dispatching the auxiliary media segment among the one or more auxiliary media segments. In some embodiments, a default return time attribute value may be the auxiliary media presentation duration associated with the auxiliary media segment. In some embodiments, the auxiliary descriptor may include an essential property descriptor or a supplemental property descriptor at an MPD level, a uniform resource name (URN) for a scheme associated with the at least one auxiliary descriptor, or a uniform resource locator associated with the auxiliary MPD among the one or more auxiliary MPD.

At operation 615, the one or more auxiliary MPD referenced in the one or more main MPD may be retrieved using the at least one auxiliary descriptor. As an example, the MSE 320 may retrieve the one or more auxiliary MPD referenced in the one or more main MPD may be using the at least one auxiliary descriptor. The auxiliary MPD of the one or more auxiliary MPD may include the one or more auxiliary media segments and an auxiliary media presentation duration.

At operation 620, the one or more auxiliary media segments and the one or more main media segments may be appended to a media source extension (MSE) source buffer, such as MSE 320.

In some embodiments, based on the auxiliary media segment among the one or more auxiliary media segments having the start time attribute being equal to zero, the auxiliary media segment may be a pre-roll auxiliary media segment, and the pre-roll auxiliary media segments may be dispatched prior to the one or more main media segments.

At operation 625, the one or more auxiliary media segments and the one or more main media segments from the MSE source buffer may be dispatched based on a presentation time offset associated with the one or more auxiliary media segments and the one or more main media segments. As an example, MSE 320 may dispatch the one or more auxiliary media segments and the one or more main media segments based on timing information from the timed metadata track parser 325, the event and metadata buffer 330, and the event and metadata synchronizer and dispatcher 335.

At operation 630, the MSE source buffer time stamp offset may be updated based on the main media segment among the one or more main media segments being stopped or the main media segment among the one or more main media segments being restarted. As an example, MSE 320 may be updated.

In some embodiments, the MSE source buffer time stamp offset may be equal to a presentation time offset associated with the auxiliary media segment. In some embodiments, the MSE source buffer time stamp offset may be updated based on a depth of a time shift buffer, the start time attribute associated with the auxiliary media segment, a total duration of all pre-roll media segments, and a presentation time offset associated with a first main media segment of the one or more main media segments. In the same or different embodiment, the MSE source buffer time stamp offset may updated to include a threshold time range between a last pre-roll auxiliary media segment and the first main media segment. In some embodiments, the MSE source buffer time stamp offset may be updated based on the return time attribute and a presentation time offset associated with one of the one or more auxiliary media segments when the one of the one or more auxiliary media segments in the MSE source buffer is dispatched.

Although FIG. 6 shows example blocks of the processes 600, in embodiments, the processes 600 may include additional blocks, fewer blocks, different blocks, or differently arranged blocks than those depicted in FIG. 6. In embodiments, any blocks of processes 600 may be combined or arranged in any amount or order, as desired. In embodiments, two or more of the blocks of the processes 600 may be performed in parallel.

The techniques described above, can be implemented as computer software using computer-readable instructions and physically stored in one or more computer-readable media or by a specifically configured one or more hardware processors. For example, FIG. 7 shows a computer system 700 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
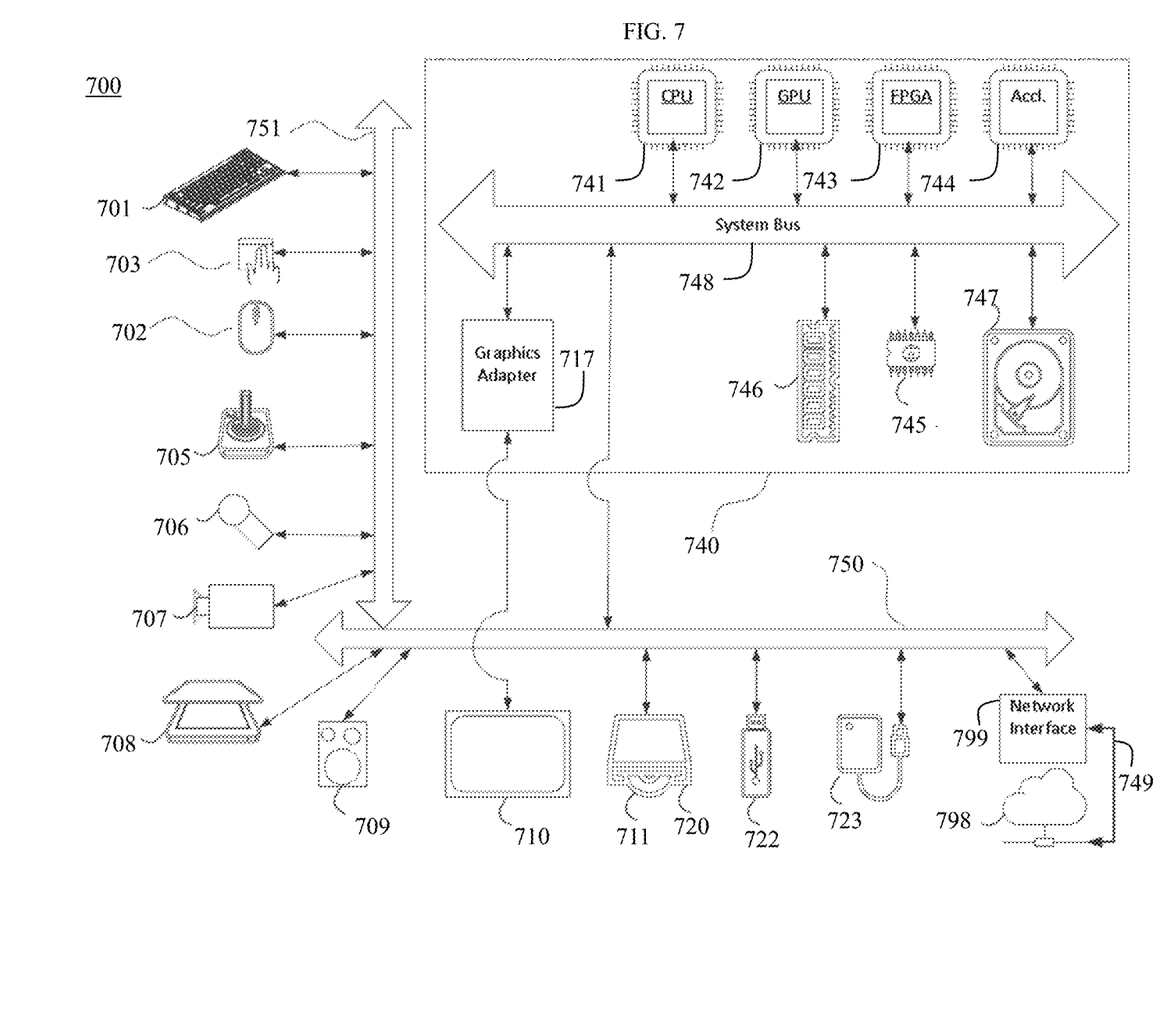
FIG. 7 is a simplified diagram of a computer system, in accordance with embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each is depicted in the Figures): keyboard 701, mouse 702, trackpad 703, touch screen 710, joystick 705, microphone 706, scanner 708, camera 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 710, or joystick 705, but there can also be tactile feedback devices that do not serve as input devices), audio output devices (such as: speakers 709, headphones), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system 700 can also include human accessible storage devices and their associated media such as optical media including CD/DVD ROM/RW 720 with CD/DVD 711 or the like media, thumb-drive 722, removable hard drive or solid state drive 723, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 700 can also include interface 799 to one or more communication networks 798. Networks 798 can for example be wireless, wireline, optical. Networks 798 can further be local, wide-area, metropolitan, vehicular and industrial, real-time, delay-tolerant, and so on. Examples of networks 798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 798 commonly require external network interface adapters that attached to certain general-purpose data ports or peripheral buses (750 and 751) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks 798, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, a graphics adapter 717, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 751. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieval to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 700 having the illustrated architecture, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as coreinternal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for signaling auxiliary media including pre-roll media content and mid-roll media content in a main dynamic adaptive streaming over HTTP (DASH) media stream, the method being performed by at least one processor, the method comprising:
   receiving one or more main media presentation description (MPD) comprising one or more main DASH media segments and at least one auxiliary descriptor including a Uniform Resource Locator (URL) referencing one or more auxiliary MPDs, wherein an auxiliary MPD among the one or more auxiliary MPDs comprises one or more auxiliary media segments that are independent of the one or more main DASH media segments;
   retrieving the one or more auxiliary MPDs referenced by the URL in the one or more main MPD using the at least one auxiliary descriptor, the auxiliary MPD of the one or more auxiliary MPDs comprising the one or more auxiliary media segments and an auxiliary media presentation duration;
   appending the one or more auxiliary media segments and the one or more main DASH media segments to a media source extension (MSE) source buffer;
   updating a MSE source buffer time stamp offset based on a depth of a time shift buffer, wherein the MSE source buffer time stamp offset is updated based on a return time attribute of the at least one auxiliary descriptor and a presentation time offset associated with one of the one or more auxiliary media segments when the one of the one or more auxiliary media segments in the MSE source buffer is dispatched; and
   dispatching the one or more auxiliary media segments and the one or more main DASH media segments from the MSE source buffer based on a presentation time offset associated with the one or more auxiliary media segments and the one or more main DASH media segments.

2. The method of claim 1, wherein the at least one auxiliary descriptor comprises:
   a start time attribute indicating a first time offset at which a main DASH media segment among the one or more main DASH media segments is stopped to dispatch an auxiliary media segment among the one or more auxiliary media segments; and
   the return time attribute indicating a second time offset at which the main DASH media segment among the one or more main DASH media segments is restarted after dispatching the auxiliary media segment among the one or more auxiliary media segments.

3. The method of claim 2, wherein updating the MSE source buffer time stamp offset comprises updating the MSE source buffer time stamp offset based on the main DASH media segment among the one or more main DASH media segments being stopped or the main DASH media segment among the one or more main DASH media segments being restarted.

4. The method of claim 2, wherein based on the auxiliary media segment among the one or more auxiliary media segments having the start time attribute being equal to zero, the auxiliary media segment is a pre-roll auxiliary media segment.

5. The method of claim 4, wherein based on the auxiliary media segment being the pre-roll auxiliary media segment, dispatching the one or more auxiliary media segments and the one or more main DASH media segments from the MSE source buffer comprises dispatching pre-roll auxiliary media segment prior to the one or more main DASH media segments.

6. The method of claim 5, wherein based on the auxiliary media segment being the pre-roll auxiliary media segment, the MSE source buffer time stamp offset is equal to a presentation time offset associated with the auxiliary media segment.

7. The method of claim 6, wherein the MSE source buffer time stamp offset is updated based on the start time attribute associated with the auxiliary media segment, a total duration of all pre-roll media segments, and a presentation time offset associated with a first main DASH media segment of the one or more main DASH media segments,
   wherein the MSE source buffer time stamp offset is updated to include a threshold time range between a last pre-roll auxiliary media segment and the first main DASH media segment.

8. The method of claim 2, wherein a default return time attribute value is the auxiliary media presentation duration associated with the auxiliary media segment.

9. The method of claim 1, wherein the at least one auxiliary descriptor further comprises:
   an essential property descriptor or a supplemental property descriptor at an MPD level;
   a uniform resource name (URN) for a scheme associated with the at least one auxiliary descriptor; and
   a uniform resource locator associated with the auxiliary MPD among the one or more auxiliary MPDs.

10. An apparatus for signaling auxiliary media including pre-roll media content and mid-roll media content in a main dynamic adaptive streaming over HTTP (DASH) media stream, the apparatus comprising:
    at least one memory configured to store computer program code;
    at least one processor configured to access the computer program code and operate as instructed by the computer program code, the computer program code including:
       receiving code configured to cause the at least one processor to receive one or more main media presentation description (MPD) comprising one or more main DASH media segments and at least one auxiliary descriptor including a Uniform Resource Locator (URL) referencing one or more auxiliary MPDs, wherein an auxiliary MPD among the one or more auxiliary MPDs comprises one or more auxiliary media segments that are independent of the one or more main DASH media segments;
       retrieving code configured to cause the at least one processor to retrieve the one or more auxiliary MPDs referenced by the URL in the one or more main MPD using the at least one auxiliary descriptor, the auxiliary MPD of the one or more auxiliary MPDs comprising the one or more auxiliary media segments and an auxiliary media presentation duration;

appending code configured to cause the at least one processor to append the one or more auxiliary media segments and the one or more main DASH media segments to a media source extension (MSE) source buffer;

first updating code configured to cause the at least one processor to update a MSE source buffer time stamp offset based on a depth of a time shift buffer, wherein the MSE source buffer time stamp offset is updated based on a return time attribute of the at least one auxiliary descriptor and a presentation time offset associated with one of the one or more auxiliary media segments when the one of the one or more auxiliary media segments in the MSE source buffer is dispatched; and dispatching code configured to cause the at least one processor to dispatch the one or more auxiliary media segments and the one or more main DASH media segments from the MSE source buffer based on a presentation time offset associated with the one or more auxiliary media segments and the one or more main DASH media segments.

11. The apparatus of claim 10, wherein the at least one auxiliary descriptor comprises:
a start time attribute indicating a first time offset at which a main DASH media segment among the one or more main DASH media segments is stopped to dispatch an auxiliary media segment among the one or more auxiliary media segments; and
the return time attribute indicating a second time offset at which the main DASH media segment among the one or more main DASH media segments is restarted after dispatching the auxiliary media segment among the one or more auxiliary media segments.

12. The apparatus of claim 11, wherein the first updating code further comprises:
second updating code configured to cause the at least one processor to update the MSE source buffer time stamp offset based on the main DASH media segment among the one or more main DASH media segments being stopped or the main DASH media segment among the one or more main DASH media segments being restarted.

13. The apparatus of claim 11, wherein based on the auxiliary media segment among the one or more auxiliary media segments having the start time attribute being equal to zero, the auxiliary media segment is a pre-roll auxiliary media segment.

14. The apparatus of claim 13, wherein based on the auxiliary media segment being the pre-roll auxiliary media segment, dispatching the one or more auxiliary media segments and the one or more main DASH media segments from the MSE source buffer comprises dispatching pre-roll auxiliary media segment prior to the one or more main DASH media segments.

15. The apparatus of claim 14, wherein based on the auxiliary media segment being the pre-roll auxiliary media segment, the MSE source buffer time stamp offset is equal to a presentation time offset associated with the auxiliary media segment.

16. The apparatus of claim 15, wherein the MSE source buffer time stamp offset is updated based on the start time attribute associated with the auxiliary media segment, a total duration of all pre-roll media segments, and a presentation time offset associated with a first main DASH media segment of the one or more main DASH media segments,
wherein the MSE source buffer time stamp offset is updated to include a threshold time range between a last pre-roll auxiliary media segment and the first main DASH media segment.

17. A non-transitory computer-readable medium storing instructions, the instructions comprising: one or more instructions that, when executed by one or more processors of a device for signaling auxiliary media including pre-roll media content and mid-roll media content in a main dynamic adaptive streaming over HTTP (DASH) media stream, cause the one or more processors to:
receive one or more main media presentation description (MPD) comprising one or more main DASH media segments and at least one auxiliary descriptor including a Uniform Resource Locator (URL) referencing one or more auxiliary MPDs, wherein an auxiliary MPD among the one or more auxiliary MPDs comprises one or more auxiliary media segments that are independent of the one or more main DASH media segments;
retrieve the one or more auxiliary MPDs referenced by the URL in the one or more main MPD using the at least one auxiliary descriptor, the auxiliary MPD of the one or more auxiliary MPDs comprising the one or more auxiliary media segments and an auxiliary media presentation duration;
append the one or more auxiliary media segments and the one or more main DASH media segments to a media source extension (MSE) source buffer;
update a MSE source buffer time stamp offset based on a depth of a time shift buffer, wherein the MSE source buffer time stamp offset is updated based on a return time attribute of the at least one auxiliary descriptor and a presentation time offset associated with one of the one or more auxiliary media segments when the one of the one or more auxiliary media segments in the MSE source buffer is dispatched; and
dispatch the one or more auxiliary media segments and the one or more main DASH media segments from the MSE source buffer based on a presentation time offset associated with the one or more auxiliary media segments and the one or more main DASH media segments.

18. The non-transitory computer-readable medium of claim 17, wherein the at least one auxiliary descriptor comprises:
a start time attribute indicating a first time offset at which a main DASH media segment among the one or more main DASH media segments is stopped to dispatch an auxiliary media segment among the one or more auxiliary media segments; and
the return time attribute indicating a second time offset at which the main DASH media segment among the one or more main DASH media segments is restarted after dispatching the auxiliary media segment among the one or more auxiliary media segments.

* * * * *